United States Patent
Kim et al.

[11] Patent Number: 5,687,631
[45] Date of Patent: Nov. 18, 1997

[54] SPEED CHANGE MECHANISM FOR SWASH PLATE TYPE HYDRAULIC MOTOR

[75] Inventors: Hyong-Eui Kim; Young-Bog Ham, both of Kyungnam, Rep. of Korea

[73] Assignee: Korea Institute of Machinery & Metals, Kyungnam, Rep. of Korea

[21] Appl. No.: 366,746

[22] Filed: Dec. 30, 1994

[30] Foreign Application Priority Data

Dec. 30, 1993 [KR] Rep. of Korea ............ 93-31212

[51] Int. Cl.$^6$ .................................................. F01B 13/04
[52] U.S. Cl. ............................................. 91/505; 417/222.1
[58] Field of Search ........................... 417/269, 222.1; 91/505, 506; 92/57, 12.1, 12.2

[56] References Cited

U.S. PATENT DOCUMENTS

| | | | |
|---|---|---|---|
| 3,130,817 | 4/1964 | Wahlmark | 417/222.1 |
| 3,339,660 | 9/1967 | Budzich | 91/506 |
| 3,784,327 | 1/1974 | Lonnemo | 417/222.1 |
| 4,825,753 | 5/1989 | Inoue et al. | 92/12.2 |
| 4,958,989 | 9/1990 | Frantz | 417/222.1 |
| 5,183,393 | 2/1993 | Schaffner | 417/222.1 |
| 5,222,870 | 6/1993 | Budzich | 417/222.1 |
| 5,320,499 | 6/1994 | Hamey et al. | 417/222.1 |

FOREIGN PATENT DOCUMENTS 4207566  9/1992  Germany ............ 417/222.1

*Primary Examiner*—Richard E. Gluck
*Attorney, Agent, or Firm*—Nikaido, Marmelstein, Murray & Oram LLP

[57] ABSTRACT

A two-stage speed change mechanism for a swash plate hydraulic motor, in which a swash plate is moved even during the revolution of the swash type hydraulic motor, thereby making it possible to vary the exclusion volume. An accommodating bore for accommodating a fixing pin is formed on a side wall of a housing. Piston for shifting the swash plate is provided, and control valves 14, 15 and 16 each including a pilot line 14, a spool 15 and a compression spring 16 are installed for the actuation of the swash plate shifting piston 3. Thus the exclusion volume can be safely varied even during the rotating of the hydraulic motor.

4 Claims, 6 Drawing Sheets

SPEED CHANGE MECHANISM FOR SWASH PLATE TYPE HYDRAULIC MOTOR

FIELD OF THE INVENTION

The present invention relates to a speed change mechanism for two-stage speed change of a swash plate hydraulic motor, which includes a swash plate, a shifting piston and a control valve, and in which the angle of the swash plate can be varied even during the revolution of the hydraulic motor, so that the requiring flow rate per one revolution(volumetric displacement) can be varied through two stages.

BACKGROUND OF THE INVENTION

Light weight and high speed are required in the hydraulic type running machine which conventionally includes an axle piston hydraulic motor, a brake valve, and reduction gear. For this purpose, the number of components is reduced, or the speed is doubled with the same flow rate.

In the case of a fixed capacity hydraulic motor, the fluid mount discharged from the pump is limited, and therefore, the maximum rotating speed is determined by the maximum discharge flow of the hydraulic fluid supplied to the hydraulic motor. Therefore, in order to obtain the maximum rotating speed in the case where the load torque is not large at the maximum flow rate, a speed change mechanism is used which is capable of reducing the requiring flow rate per one revolution(volumetric displacement) of the hydraulic motor.

In the case of the swash plate type axle piston hydraulic motor, in order to vary the exclusion volume, there is adopted a speed change mechanism which is capable of varying the piston diameter, the piston pitch circle diameter of the piston barrel, or the number of pistons. However, there is the problem that such speed change mechanisms cannot be operated during the revolution of the hydraulic motor.

SUMMARY OF THE INVENTION

The present invention is intended to overcome the above described disadvantages of the conventional techniques.

Therefore it is the object of the present invention to provide a speed change mechanism for a swash plate hydraulic motor, in which swash plates having different angles can be moved even during the revolutions of the hydraulic motor by utilizing swash plate shifting pistons and control valves.

BRIEF DESCRIPTION OF THE DRAWINGS

The above object and other advantages of the present invention will become more apparent by describing in detail the preferred embodiment of the present invention with reference to the attached drawings in which:

FIGS. 3A and 3B illustrate an actuating state of a spool of a control valve, in which:

FIG. 3A illustrates a state shifted to a first speed; and

FIG. 3B illustrates a state shifted to a second speed;

FIGS. 4A and 4B illustrate shifted states of the swash plates, in which:

FIG. 4A illustrates a state shifted to a first speed; and

FIG. 4B illustrates a state shifted to a second speed;

FIGS. 5A and 5B illustrate the shape of the swash plate, in which:

FIG. 5A is a perspective view;

FIG. 5B is a left side view; and

DESCRIPTION OF THE PREFERRED EMBODIMENT

Figure 1:
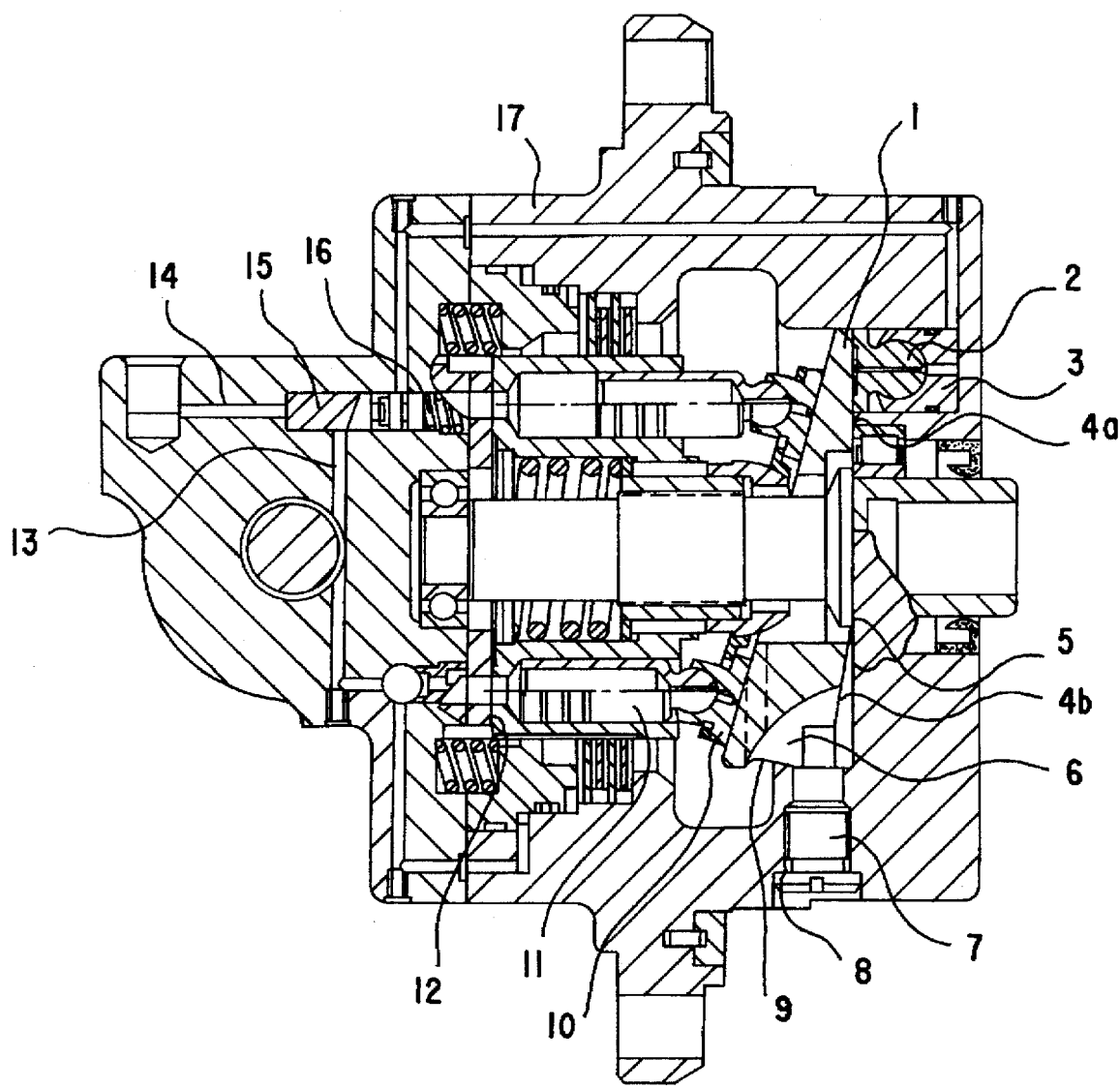
FIG. 1 is a sectional view showing a preferred embodiment of the present invention.

FIG. 1 is a sectional view showing a preferred embodiment of the present invention in which the speed change mechanism of the present invention is applied to the conventional hydraulic motor. The constitution of the present invention will be described referring to FIG. 1.

There is provided a housing 17, and the housing 17 is constituted as follows. That is, it includes an accomodating bore having a fixing pin 7 which prevents the simultaneous rotation of the swash plate due to the friction torque of nine slipper pads 10 which perform slipping and rotating movements on the inclined face of a Swash plate 1, and which perform reciprocating movements within a cylinder barrel 12. The housing further includes a threaded portion which is formed in the accomodating bore for preventing the push-out of the fixing pin due to the internal pressure of the housing. Further, an oil ring 8 is installed at an arbitrary position where the fixing pin 7 is buried into the housing 17, for preventing the leakage of oil through the threaded portion of the fixing pin 7 during the revolution of the hydraulic motor. Further, on the lower portion of the swash plate 1, there is formed groove 6 in the direction of the shifting of the swash plate for accommodating the fixing pin 7 without affecting the shifting of the swash plate 1.

Further, the housing 17 has to be provided with a cylindrical bore for receiving a piston 3 for shifting the swash plate 1. In the case where an oil ring is used on the shifting piston 3, the precision of the cylindrical bore is not sternly restricted. However, in the case where a mechanical seal is installed between the piston and the cylinder, the inside diameter of the cylindrical bore has to be highly precise by taking into account the diameter of the shifting piston 3 for preventing the loss and leakage of the shifting pressure. Not that a separate hydraulic pressure supplying tube is installed for supplying the hydraulic fluid into the cylinder, but that a hydraulic pressure supplying tube (not shown in FIG. 1) is installed on the internal wall of the housing 17 for the light weight of the hydraulic motor. Thus, a hydraulic pressure fluid is intermittently supplied from a second speed controlling pilot valve which is installed on a cover at the rear of the hydraulic motor.

Figure 2:
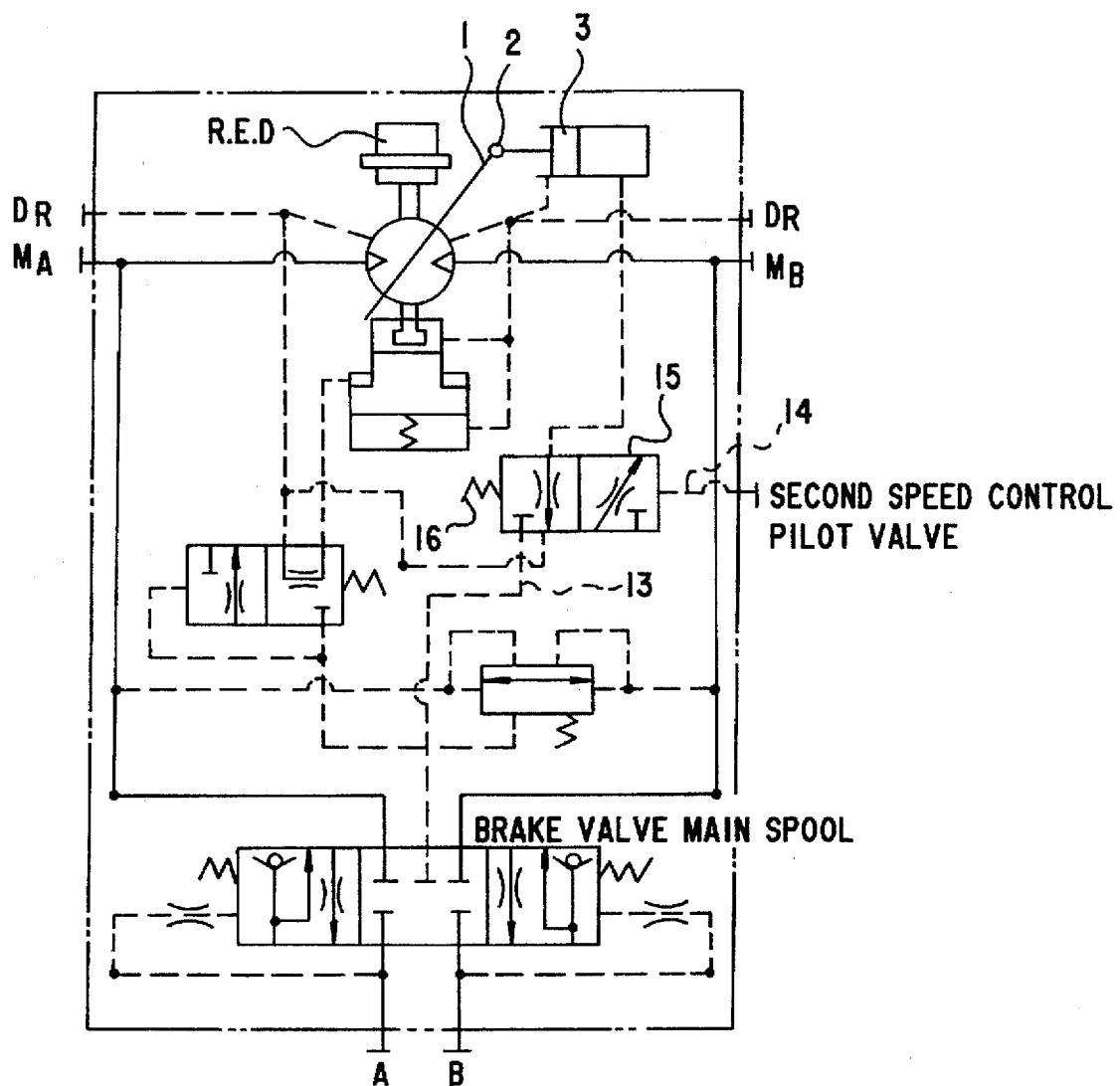
FIG. 2 illustrates the hydraulic circuit for operating the control valves.
Figure 3A:
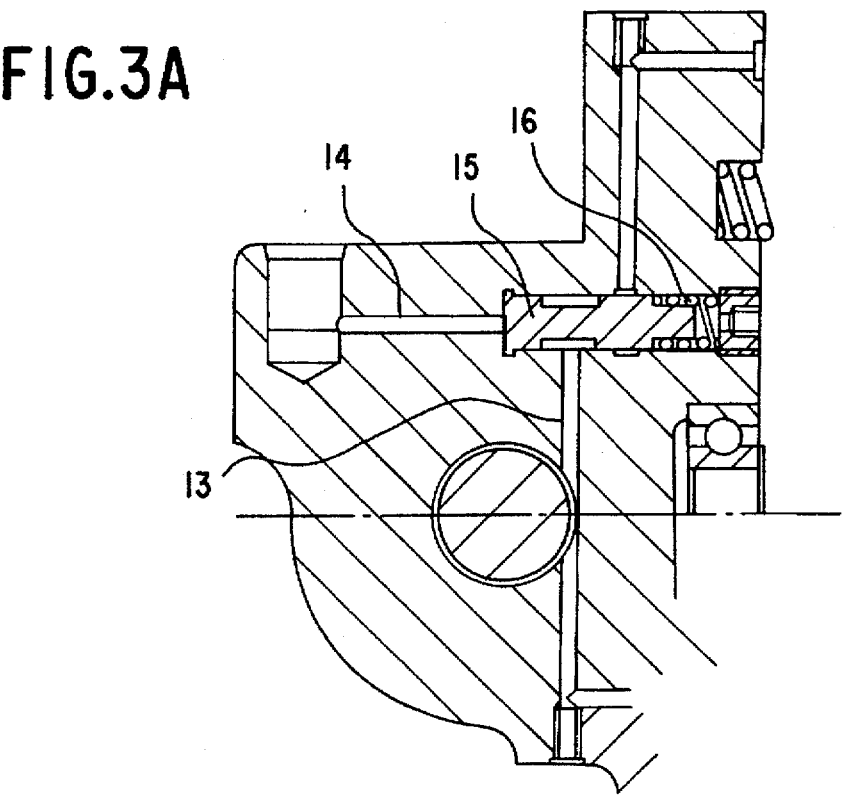
Figure 3B:
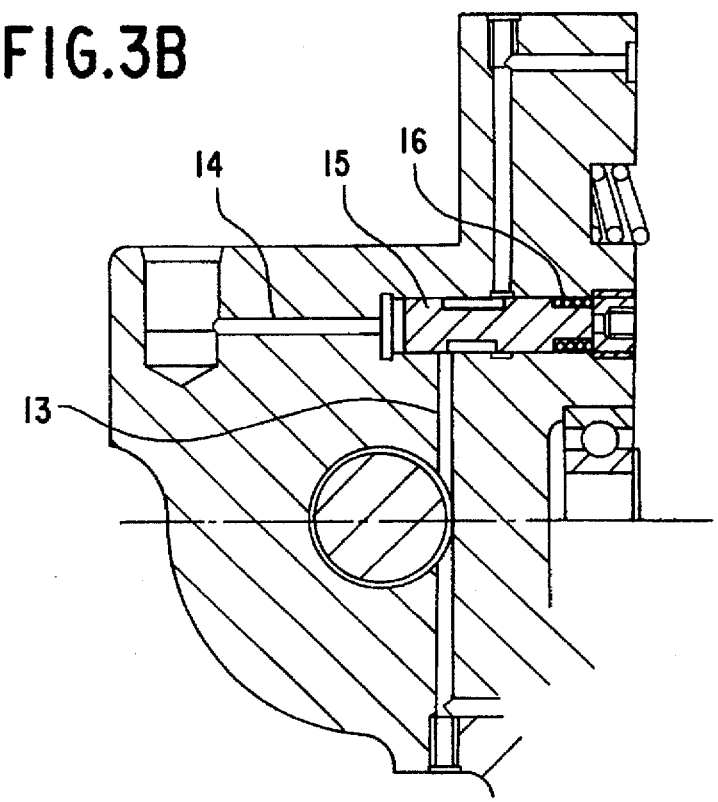
Figure 4A:
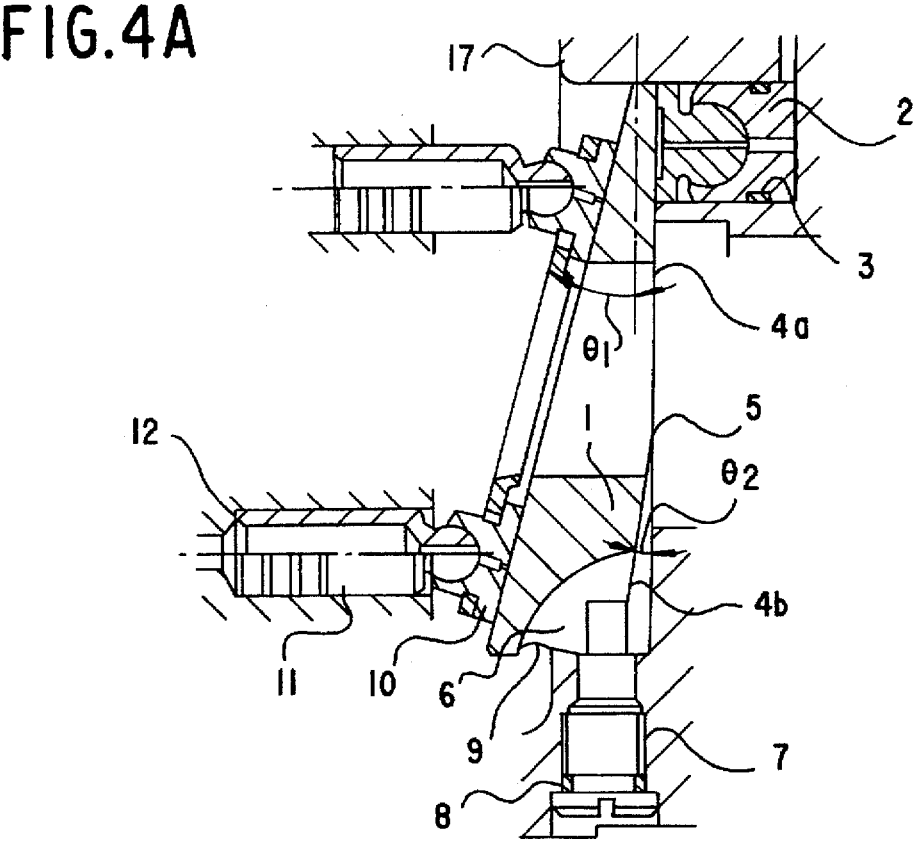
Figure 4B:
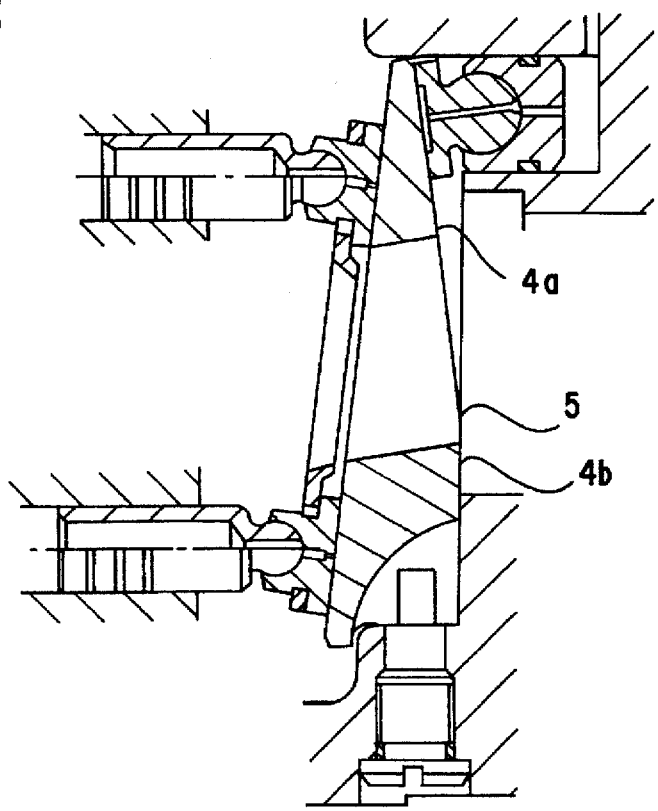

FIG. 2 illustrates a hydraulic circuit for operating the control valves. FIGS. 3A and 3B illustrate the actuating states of a spool of a control valve, and FIGS. 4A and 4B illustrate shifted states of the inclined plates. The description for the portions which correspond to the conventional hydraulic circuit will be skipped, and only the hydraulic circuits which control the control valves of the present invention (the control valves includes a pilot line 14, a spool 15 and a compression spring 16), and which controls the swashed plate shifting piston 3 will be described. Further their operation will also be described.

In order to control the second speed, a control valve is required, and this control valve is provided integrally with the running motor. The function of the control valve is as follows. That is, when the running motor is required to be shifted to the second speed during its operation, a part of the pressure fluid which is supplied to the running motor is supplied intermittently to the cylinder of the swash plate shifting piston 3. When this supply connection is realized, the fluid of the cylinder is discharged, and it is connected to an outer drain tube of the interior of the housing 17.

The control valve includes: a bore for accommodating the spool 15 within the rear cover of the motor; a supply pressure line 13 connected to a hydraulic flow path supplying the hydraulic fluid to the motor; a pilot line 14 for receiving external pilot pressure signals; and a compression spring 16 installed at the side opposite from side where the outer pilot pressure is acted. When the hydraulic fluid is supplied to the port A or B, a brake main spool moves to the left and right, so that the hydraulic fluid of the port A or B would be supplied to the pressure supply tube. Under this condition, owing to the action of the pressure of the second speed controlling pilot valve, if the pressure is acted to the interior of the pilot line 14, then the pressure reaches the left side face of the spool 15. Consequently, as shown in FIG. 3B, the spool moves to the right, and the pressure of the interior of the supply pressure line 13 passes through the spool 15 to reach the interior of the cylinder of the swash plate shifting piston 3. As a result, the swash plate 1 is pushed, so that the second inclined face would contact with the wall face of the housing 17. Consequently, the state of FIG. 4B is realized (a state shifted to the second speed).

Then, in order to shift to the first speed, if the pressure signal of the second speed pilot valve is released, the pressure of the pilot line 14 is lowered, so that the compression spring 16 would be extended. Under this condition, the spool 15 becomes like the state of FIG. 3A, and the hydraulic fluid of the swash plate shifting cylinder flows into the housing 17 to be discharged to an outer drain port $D_R$. At the same time, the swash plate 1 returns to form a large inclination angle θ1 which correspond to the original state, with the result that the state of FIG. 4A is realized (a state shifted to the first speed).

Figure 5A:
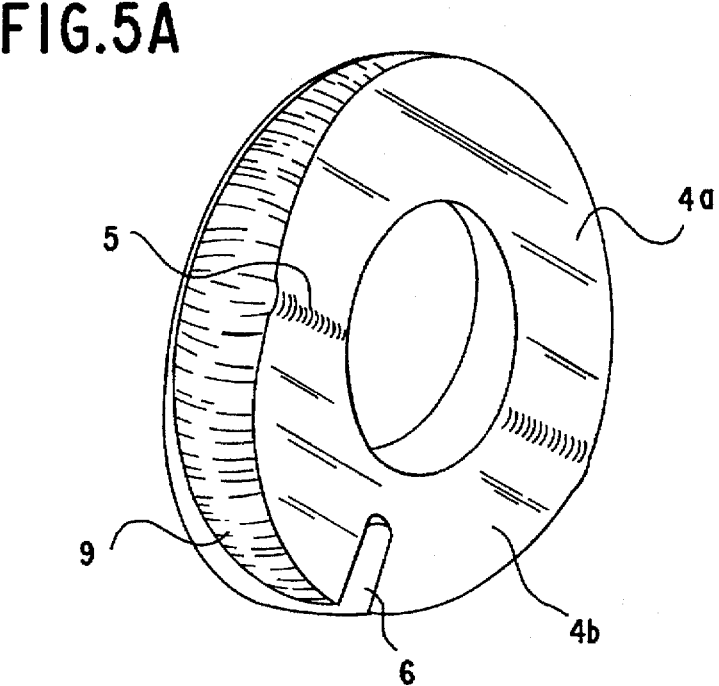
Figure 5B:
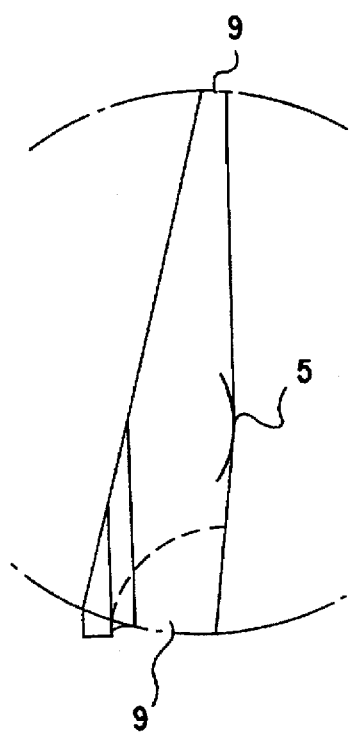
Figure 5C:
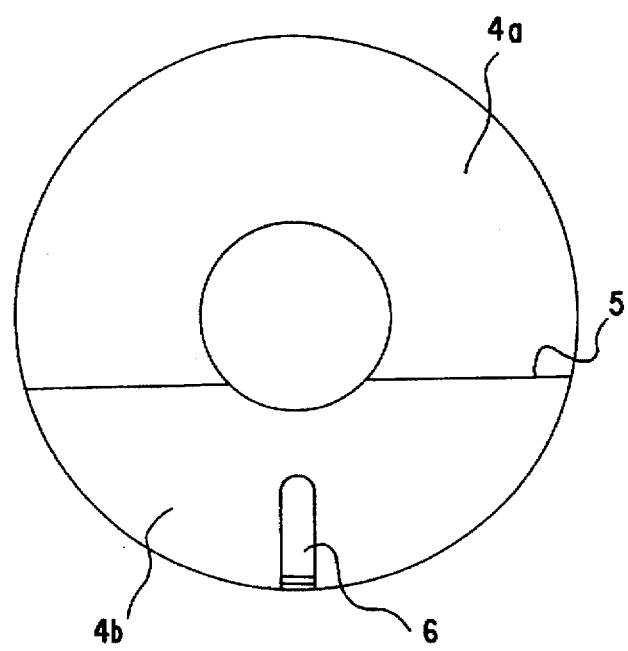
FIG. 5C is a frontal view.

The swash plate 1 of the present invention is constituted as follows. That is, as shown in FIG. 5, a boundary edge 5 is provided between a first inclined face 4a forming a large inclination angle θ1 and a second inclined face 4b forming a small inclination angle θ2 for making the contact with the housing 17. Further, in order that the shifting of the swash plate 1 would not be impeded, the side has a spherical face 9, so that the swash plate 1 would perform sliding movements along the inner wall face of the housing 17.

Figure 6:
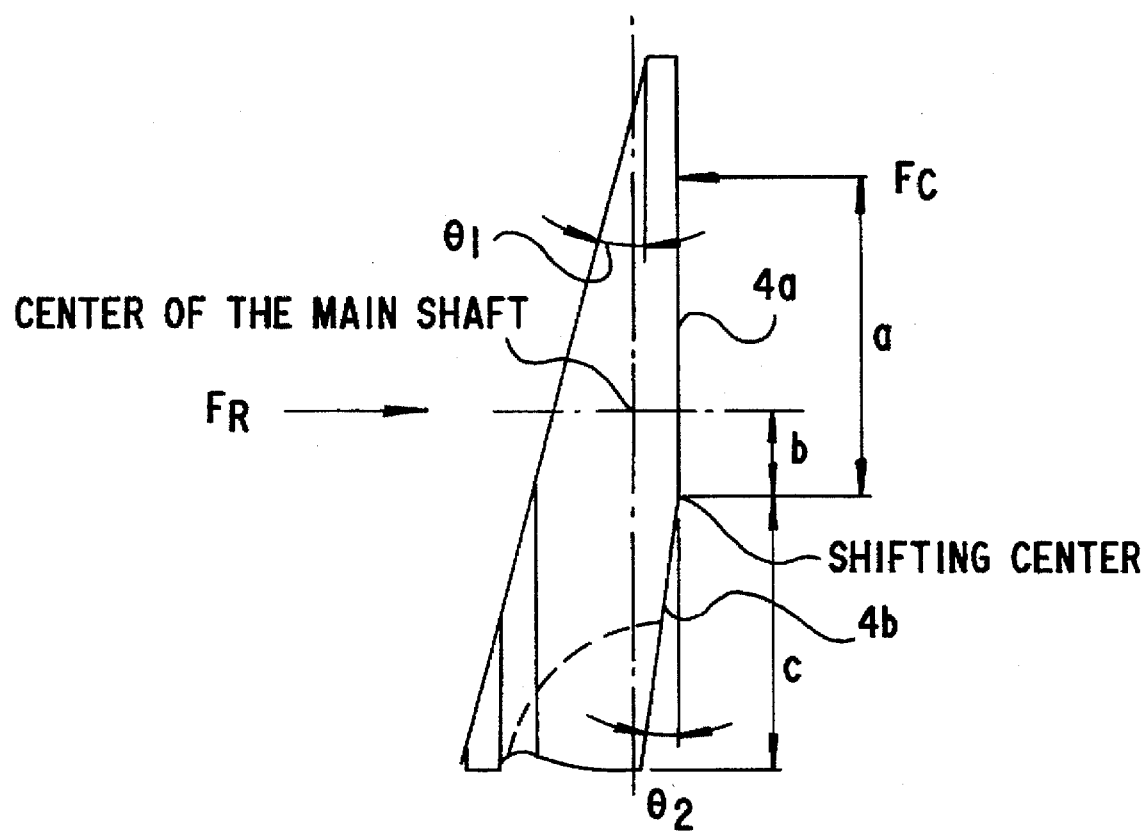
FIG. 6 illustrates the acting force applied to the swash plates and their positions.

The important matter in shifting the swash plate 1 to the second speed is the diameter of the swash plate shifting piston 3 and the position of the piston. This will be described below referring to FIG. 6. In FIG. 6, $F_R$: Resultant force of nine pistons;

$F_c$: Piston force applied to the shifting of the swash plate;

θ1: Inclination angle for first speed;

θ1–θ2: Inclination angle for second speed;

a: Distance from the shifting center to the center of the swash plate shifting piston;

b: Distance from the center of the shaft of hydraulic motor to the shifting center of the swash plate; and c: Distance from the shifting center of the swash plate to the edge of the swash plate.

The diameter of the piston is closely related to the piston force Fc which is applied to the shifting operation of the swash plate. A shifting torque T1 for shifting the swash plate 1 is equivalent to the piston force Fc (reaching the shifting of the swash plate) times a distance a between the center of the shifting piston and the shifting center. A torque T2 which inhibits the shifting of the swash plate 1 is matched with the torque T1. The torque T2 is equivalent to the resultant force $F_R$ of the nine pistons (in the case of using nine pistons for the hydraulic motor) for rotating the cylinder barrel 12 multiplied by a distance b between the center of the main shaft of the hydraulic motor and the shifting center.

Under this condition, if the swash plate shifting torque T1 is too large compared with the torque T2 which is the resultant forces of the nine pistons, then the swash plate is flipped with the end of the swash plate 1 being the pivoting center. This is an over-shifting torque T3, and this torque T3 is equivalent to the piston force Fc (reaching the shifting of the swash plate) multiplied by a distance (a+c) between the center of the swash plate shifting piston 3 and the end point of the circular swash plate 1. And, over-shifting resistance torque T4 is equivalent to the resultant force $F_R$ of the nine pistons multiplied by a distance (b+c) between the center of the main shaft of hydraulic motor and the end point of the circular swash plate 1.

That is, if the swash plate 1 is not to be flipped but to be stably shifted, the torque T1 has to be larger than the torque T2, and the torque T3 has to be smaller than the torque T4. That is, the following relation has to be satisfied. T2<T1 and T3<T4, i.e., $(F_R \times b) < (Fc \times a), \{F_c \times (a+c)\} < \{F_R \times (b+c)\}$.

Therefore, if $F_R$, b and a have been determined based on the condition of $(F_R \times b) < (Fc \times a)$, then Fc can be determined, and therefore, the diameter of the swash plate shifting piston 3 can be determined. Further, Fc and a have been determined based on the relation $\{(F_c \times (a+b)\} < \{F_R \times (b+c)\}$, and therefore, c can be determined.

According to the present invention as described above, the swash plate, the swash plate shifting pistons and the control valves are provided integrally with the conventional fixed swash plate type hydraulic motor. Therefore, a light weight hydraulic motor can be realized, and the exclusion volume can be varied even during the operation of the hydraulic motor, so that speed changes during the rotating of the hydraulic motor can be realized with the same fluid amount. Thus the function of the hydraulic motor is diversified.

What is claimed is:

1. A speed change mechanism for a swash plate type hydraulic motor, comprising:

a housing;

a swash plate rockingly positioned in said housing;

an accommodating bore formed on a side wall of said housing;

a fixing pin accommodated into said accommodating bore and engaging said swash plate for preventing the rotation of said swash plate;

a shifting piston inserted into a cylinder formed within said housing for shifting said swash plate; and a control valve built in said housing including a spool, a hydraulic pressure pilot line at one end of said spool, and a compression spring at the opposite end of said spool, said valve being positioned in a control line for the actuation of said swash plate shifting piston;

said swash plate being provided with a boundary edge between a first inclined face and a second inclined face, and sides which are spherically formed.

2. A speed change mechanism for a swash plate type hydraulic motor, comprising:

a housing;

a swash plate rockingly positioned in said housing;

an accommodating bore formed on a side wall of said housing;

a fixing pin accommodated into said accommodating bore and engaging said swash plate for preventing the rotation of said swash plate, a groove being formed on one face of the swash plate in the swash plate shifting direction, so that said accommodating bore would accommodate said fixing pin with out affecting the shifting of said swash plate;

a shifting piston inserted into a cylinder formed within said housing for shifting said swash plate; and a control valve built in said housing including a spool, a hydraulic pressure pilot line at one end of said spool, and a compression spring at the opposite end of said spool, said valve being positioned in a control line for the actuation of said swash plate shifting piston.

3. A speed change mechanism for a swash plate type hydraulic motor, comprising:

a housing;

a swash plate rockingly positioned in said housing;

an accommodating bore formed on a side wall of said housing;

a fixing pin accommodated into said accommodating bore and engaging said swash plate for preventing the rotation of said swash plate;

a shifting piston inserted into a cylinder formed within said housing for shifting said swash plate; and a control valve built in said housing including a spool, a hydraulic pressure pilot line at one end of said spool, and a compression spring at the opposite end of said spool, said valve being positioned in a control line for the actuation of said swash plate shifting piston, said control line comprising a supply pressure line connected to a hydraulic flow path leading to said motor and connected to a bore for accommodating said spool within a motor cover; and said pilot line receives external pilot pressure signals.

4. A two-stage speed change mechanism for a swash plate type hydraulic motor, comprising:

a housing;

a swash plate rockingly positioned in said housing;

an accommodating bore formed on a side wall of said housing;

a fixing pin accommodated into said accommodating bore and engaging said swash plate for preventing the rotation of said swash plate;

a shifting piston inserted into a cylinder formed within said housing for shifting said swash plate, the diameter and position of said swash plate shifting piston being determined in such a manner that said swash plate is stably shifted based on a condition $(F_R \times b) < (F_c \times a)$ and $\{(F_c \times (a+c))\} < \{F_R \times (b+c)\}$ wherein $F_R$: Resultant force of pistons and slipper pads 10;

$F_c$: Piston force applied to the shifting of the swash plate;

a: Distance from the shifting center to the center of the swash plate shifting piston;

b: Distance from the center of the shaft of hydraulic motor to the shifting center of the swash plate; and c: Distance from the shifting center of the swash plate to the edge of the swash plate; and a control valve built in said housing including a spool, a hydraulic pressure pilot line at one end of said spool, and a compression spring at the opposite end of said spool, said valve being positioned in a control line for the actuation of said swash plate shifting piston.

\* \* \* \* \*